(12) United States Patent
Duman et al.

(10) Patent No.: US 10,216,716 B2
(45) Date of Patent: Feb. 26, 2019

(54) METHOD AND SYSTEM FOR ELECTRONIC RESOURCE ANNOTATION INCLUDING PROPOSING TAGS

(75) Inventors: Hakan Duman, Ipswich (GB); Alexander L Healing, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 298 days.

(21) Appl. No.: 12/919,571

(22) PCT Filed: Mar. 31, 2009

(86) PCT No.: PCT/GB2009/000845
§ 371 (c)(1),
(2), (4) Date: Aug. 26, 2010

(87) PCT Pub. No.: WO2009/122160
PCT Pub. Date: Oct. 8, 2009

(65) Prior Publication Data
US 2010/0332964 A1    Dec. 30, 2010

(30) Foreign Application Priority Data
Mar. 31, 2008 (EP) ..................................... 08251240

(51) Int. Cl.
*G06F 17/00* (2006.01)
*G06F 17/24* (2006.01)
*G06F 17/30* (2006.01)

(52) U.S. Cl.
CPC ...... *G06F 17/241* (2013.01); *G06F 17/30722* (2013.01)

(58) Field of Classification Search
CPC ..................................................... G06F 17/218
(Continued)

(56) References Cited

U.S. PATENT DOCUMENTS 5,943,670 A    8/1999   Prager
6,484,149 B1   11/2002  Jammes et al.
(Continued)

FOREIGN PATENT DOCUMENTS

WO     2009/030902       3/2009

OTHER PUBLICATIONS

Basile, et al., "Recommending Smart Tags in a Social Bookmarking System" 2007, p. 22-29.*
(Continued)

*Primary Examiner* — Amelia L Tapp
(74) *Attorney, Agent, or Firm* — Nixon & Vanderhye P.C.

(57) ABSTRACT

A distributed system is described in which resource utilization decisions depend upon the categorization of resource descriptions stored in the distributed system. In the principal embodiment, the resource descriptions are web service descriptions which are augmented with tags (i.e. descriptive words or phrases) entered by users and/or by web service administrators. The system stores, for different groups of users, groups of tags popularly used by users within those groups. By monitoring tags input by a user, and proposing tags to the user from any groups which are under-represented in tags input by the user, a more balanced set of tags describing resources in the system is obtained. This leads to a more coherent and focussed set of tags in the system, which in turns results in better resource utilization decisions and hence a more efficient use of the resources of the distributed system.

18 Claims, 14 Drawing Sheets

(58) Field of Classification Search
USPC .......................................................... 715/230
See application file for complete search history.

(56) References Cited

U.S. PATENT DOCUMENTS

| | | | |
|---|---|---|---|
| 7,548,914 B2* | 6/2009 | Bell et al. | |
| 7,685,198 B2 | 3/2010 | Xu et al. | |
| 7,685,200 B2* | 3/2010 | Gunawardena et al. | 707/748 |
| 7,870,135 B1 | 1/2011 | Cheung | |
| 7,953,775 B2* | 5/2011 | Dasdan | 707/830 |
| 8,386,486 B2 | 2/2013 | Zhang et al. | |
| 8,630,627 B2 | 1/2014 | Davitz et al. | |
| 8,700,648 B2 | 4/2014 | Bhamidipati et al. | |
| 8,706,734 B2 | 4/2014 | Duman et al. | |
| 8,818,337 B2* | 8/2014 | Narasimhan | G06F 17/301 455/412.1 |
| 8,832,109 B2 | 9/2014 | Ghanea-Hercock et al. | |
| 2004/0267734 A1 | 12/2004 | Toshima | |
| 2006/0117003 A1 | 6/2006 | Ortega et al. | |
| 2006/0184566 A1* | 8/2006 | Lo et al. | 707/102 |
| 2007/0078832 A1* | 4/2007 | Ott et al. | 707/3 |
| 2007/0174247 A1* | 7/2007 | Xu | G06F 17/30722 |
| 2007/0226077 A1 | 9/2007 | Frank et al. | |
| 2008/0005651 A1 | 1/2008 | Grefenstette et al. | |
| 2008/0034291 A1* | 2/2008 | Anderson | G06F 17/30861 715/700 |
| 2008/0040674 A1* | 2/2008 | Gupta | 715/745 |
| 2008/0059897 A1* | 3/2008 | Dilorenzo | G06F 17/30719 715/764 |
| 2008/0082486 A1* | 4/2008 | Lermant | G06F 17/30722 |
| 2008/0092044 A1* | 4/2008 | Lewis | G06F 17/30722 715/713 |
| 2008/0195657 A1 | 8/2008 | Naaman et al. | |
| 2008/0235216 A1 | 9/2008 | Ruttenberg | |
| 2008/0270538 A1 | 10/2008 | Garg et al. | |

OTHER PUBLICATIONS

Yusef Hassan-Montero and Victor Herrero-Solana, "Improving Tag-Clouds as Visual Information Retrieval Interfaces", Mérida, INSCIT2006—which was document 28 in the IDS e-mail I sent you on your cases 36-2295 and 36-2379 on Oct. 23, 2012, 6 pgs.

Hayman, S., & Lothian, N. (2007). Taxonomy Directed Folksonomies: Integrating user tagging and controlled vocabularies for Australian education networks. World Library and Information Congress: 73rd IFLA General Conference and Council, Aug. 19-23, 2007, Durban, South Africa—available at http://archive.ifla.org/IV/ifla73/papers/157-Hayman_Lothian-en.pdf, 27 pgs.

Grigory Begelman,"Automated Tag Clustering: Improving search and exploration in the tag space", In Proc. of the Collaborative Web Tagging Workshop at WWW'06—see http://www.pui.ch/phred/automated_tag_clustering/automated_tag_clustering.pdf (was item 34 in the IDS e-mail I sent you on your cases 36-2295 and 36-2379 on Oct. 23, 2012), 5 pgs.

Lucia Specia and Enrico Motta. 2007. Integrating Folksonomies with the Semantic Web. In Proceedings of the 4th European conference on The Semantic Web: Research and Applications (ESWC '07), Enrico Franconi, Michael Kifer, and Wolfgang May (Eds.). Springer-Verlag, Berlin, Heidelberg, 624-639, 32 pgs.

Hsieh W et al: "A collaborative tagging system for learning resources sharing," Current Developments in Technology-Assisted Education vol. II, Formatex, [Online] vol. 2, 2006, pp. 1364-1368, XP002486118 Badajoz, Spain ISBN: 978-84-690-2472-8, 6 pgs.

Brooks H B et al.: "Improved annotation of the blogosphere via autotagging and hierarchical clustering" Proceedings of 15th International World Wide Web Conference WWW2006, [Online] May 23, 2006 (May 23, 2006), pp. 625-631, Edinburg, Scotland, UK ISBN: 1-59593-323-9, 7 pgs.

Bruno M et al: "An approach to support Web service classification and annotation" Proceedings. The 2005 IEEE International Conference on E-Technology, E-Commerce and E-Service IEEE Comput. Soc Los Alamitos, CA, USA, 2005, pp. 138-143, ISBN: 0-7695-2274-2, 6 pgs.

Ae-Ttie Ji et al: "Collaborative tagging in recommender systems" AI 2007: Advances in Artificial Intelligence. Proceedings 20th Australian Joint Conference on Artificial Intelligence. (Lecture Notes in Artificial Intelligence vol. 4830) Springer-Verlag Berlin, Germany, 2007, pp. 377-386, ISBN: 3-540-76926-9, 10 pgs.

Meyer H et al: "Light-weight semantic service annotations through tagging" Service-Oriented Computing—ICSOC 2006. 4th International Conference. Proceedings (Lecture Notes in Computer Science vol. 4294) Springer-Verlag Berlin, Germany, 2006, pp. 465-470, ISBN: 3-540-68147-7, 6 pgs.

Kaser O et al: "Tag-Cloud Drawing: Algorithms for Cloud Visualization" Proceedings of Tagging and Metadata for Social Information Organization Workshop in Conjunction With the 16th International World Wide Web Conference WWW2007, [Online] May 8, 2007 (May 8, 2007), Banff, Canada, 10 pgs.

Niwa S et al: "Web page recommender system based on folksonomy mining for ITNG '06 submissions" Proceedings. Third International Conference on Information Technology: New Generation IEEE Computer Society Los Alamitos, CA, USA, 2006, p. 6 pgs.

You Are What You Tag by: Yi-Ching Huang, Chia-Chuan Hung, Jane Y. Hsu in Proceedings of AAAI 2008 Spring Symposium Series on Social Information Processing (2008)—see http://www.aaai.org/Papers/Symposia/Spring/2008/SS-08-06/SS08-06-008.pdf, 6 pgs.

Xu Z et al: "Towards the Semantic Web: Collaborative Tag Suggestions" Proceedings of 15th International World Wide Web Conference WWW2006 Proceedings of the Collaborative Web Tagging Workshop, [Online] May 23, 2006 (May 23, 2006), XP002486198 Edinburgh, Scotland, UK, 8 pgs.

International Search Report dated May 27, 2009 issued in International Application No. PCT/GB2009/000841, 4 pages.

Office Action dated Feb. 16, 2012 issued in co-pending U.S. Appl. No. 12/918,489, 17 pages.

International Search Report dated May 8, 2009 issued in International Application No. PCT/GB2009/000845, 2 pages.

Rashmi's blog, "A cognitive analysis of tagging", posted on Sep. 27, 2005 (30 pgs.).

Office Action (13 pgs.) dated Nov. 20, 2014 issued in co-pending U.S. Appl. No. 13/254,971.

Office Action (13 pgs.) dated Apr. 24, 2014 issued in co-pending U.S. Appl. No. 13/254,971.

U.S. Appl. No. 12/675,585, filed Feb. 26, 2010, Distributed System.

U.S. Appl. No. 12/919,571, filed Aug. 26, 2010, Method and System for Electronic . . . .

U.S. Appl. No. 13/254,971, filed Sep. 6, 2011, Electronic Resource Storage System.

International Search Report for PCT/GB2009/000845, dated May 8, 2009.

Calefato, F. et al., "Towards Social Semantic Suggestive Tagging", 4th Italian Web Workshop Semantic Web Applications and Perspectives Swap 2007, (2007), Abstract. (9 pgs.).

Xu, Z. et al., "Towards the Semantic Web: Collaborative Tag Suggestions" [Online], Proceedings of the World Wide Web Conference WWW2006, (2006), pp. 1-8. (8 pgs.).

Shiland, S., et al., "Tagging, communities, vocabulary, evolution", Conference on Computer Supported Cooperative Work CSCW, (Nov. 2006), Abstract. (11 pgs.).

Milan, V. et al., "Suggesting Tags in Collaborative Tagging Applications", Microsoft Corporation Technical Report, (Feb. 2007), Abstract. (17 pgs.).

Nikhil, G. et al., "Personalized tag suggestion for flickr", ACM, Proceeding of the 17th Int'l. Conf. On World Wide Web, (Apr. 21, 2008), Abstract (2 pgs.).

* cited by examiner

| Service ID | User-Assigned Tags | Categories |
|---|---|---|
| H1 | <TC1:helicopter>, <P2:fast>, <P1:thermal>, <TC1:camera> <P3:nightvision> | Comms.Camera.Mobile |

Figure 2A

| Service ID | User-Assigned Tags | Categories |
|---|---|---|
| H2 | <TC1:helicopter>, <P3:location>, <P1:mapping>, <P2:display> <P1:passenger> | Location |

Figure 2B

| Service ID | User-Assigned Tags | Categories |
|---|---|---|
| C1 | <TC2:road>, <P2:driver>, <P2:car> <TC1:text>, <P1:remember> | Comms.Display.Text |

Figure 2C

| Service ID | User-Assigned Tags | Categories |
|---|---|---|
| C2 | <TC2:road>, <P2:driver>, <P2:car> <P1:touchscreen>, <P1:remember> <P3:interactive>, <P3:location>, <P1:mapping> <TC1:picture> | Comms.Display.Graphics |

Figure 2D

| Service ID | User-Assigned Tags | Categories |
|---|---|---|
| C3 | <P2:voice> <P3:radio> | Comms.Voice |

Figure 2E

| Service ID | User-Assigned Tags | Categories |
|---|---|---|
| P1 | <P2:beat>, <P2:voice> <P2:acknowledged> <TC2:noisy> | Comms.Voice |

Figure 2F

| Service ID | User-Assigned Tags | Categories |
|---|---|---|
| S1 | <TC2:road> , <P2:drivers>, <P2:sign>, <TC1:text> | Comms.Display.Text |

Figure 2G

| Service ID | User-Assigned Tags | Categories |
|---|---|---|
| S2 | <TC2:road> , <P2:drivers>, <P2:sign>, <TC1:graphics> | Comms.Display.Graphics |

Figure 2H

| Service ID | User-Assigned Tags | Categories |
|---|---|---|
| C4 | <TC1:gps>, <P2:driver> <P1:direction> <TC1:route> | Location |

Figure 2I

| Service ID | User-Assigned Tags | Categories |
|---|---|---|
| F1 | <P2:yobs> <P2:fridaynight> <P1:towncentre> <TC1:view> <P3:street> <P1:remotecontrolled> <TC2:camera> <TC2:road> <P1:camera> | Comms.Camera.Fixed |

Figure 2J

| User Profile ||
|---|---|
| User ID | P1 |
| User Group | Police |
| Target Tagging Tendencies | $w'_{personal} = 0.5$ \| $w'_{police} = 0.6$ \| $w'_{traffic} = 0.4$ \| $w'_{collective} = 0.5$ |
| Actual Tagging Tendencies | $w_{personal} = 0.85$ \| $w_{police} = 0.7$ \| $w_{traffic} = 0.2$ \| $w_{collective} = 0.35$ |

Figure 3B-1

| User Tags | <thermal>, <mapping (2)>, <passenger>, <remember (2)>, <camera>, <remotecontrolled>, <touchscreen>, <direction> |
|---|---|

Figure 3B-2

| Police Tags | <thermal>, <mapping (2)>, <passenger>, <remember (2)>, <camera>, <remotecontrolled>, <touchscreen>, <direction>, <fast>, <nightvision>, <location (2)>, <driver (3)>, <car (2)> <interactive>, <voice (2)>, <radio>, <beat>, <acknowledged>, <drivers (2)>, <sign (2)>, <display>, <yobs>, <fridaynight>, <street> |
|---|---|

Figure 3B-3

| Traffic Controller Tags | <helicopter (2)>, <camera (2)> <road (5)>, <text (2)>, <picture>, <noisy>, <graphics>, <route>, <view>, <gps> |
|---|---|

Figure 3B-4

| Collective Tags | <thermal>, <mapping (2)>, <passenger>, <remember (2)>, <camera (3)>, <remotecontrolled>, <touchscreen>, <direction>, <fast>, <nightvision>, <location (2)>, <driver (3)>, <car (2)> <interactive>, <voice (2)>, <radio>, <beat>, <acknowledged>, <drivers (2)>, <sign (2)>, <display>, <yobs>, <fridaynight>, <street>, <helicopter (2)>, <road (5)>, <text (2)>, <picture>, <noisy>, <graphics>, <route>, <view>, <gps> |
|---|---|

Figure 3B-5

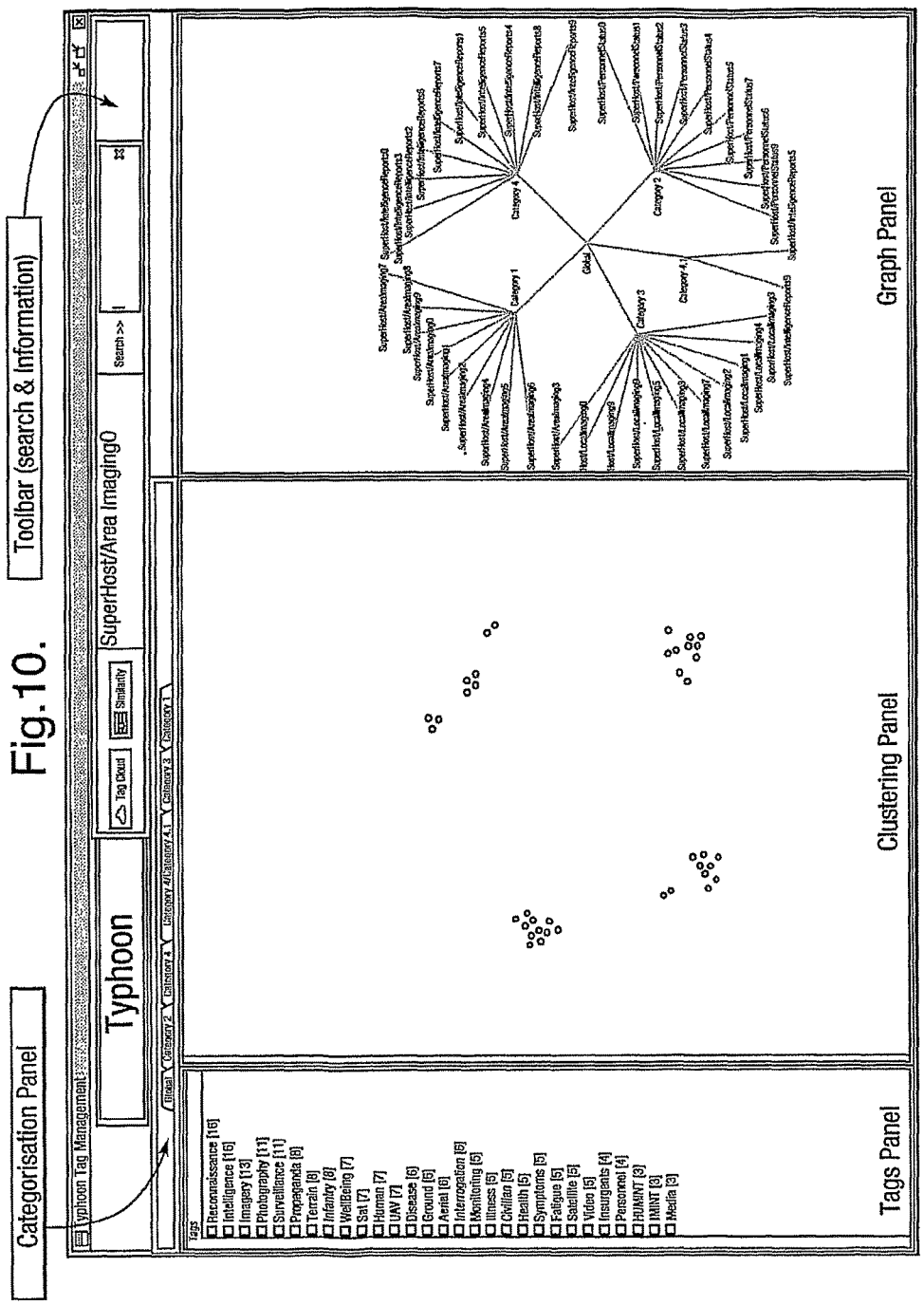

METHOD AND SYSTEM FOR ELECTRONIC RESOURCE ANNOTATION INCLUDING PROPOSING TAGS

This application is the U.S. national phase of International Application No. PCT/GB2009/000845 filed 31 Mar. 2009, which designated the U.S. and claims priority to EP Application No. 08251240.1 filed 31 Mar. 2008, the entire contents of each of which are hereby incorporated by reference.

BACKGROUND AND SUMMARY

The present invention relates to electronic resource annotation. It has particularly utility when applied in electronic information retrieval, whether that information be in the form of documents or photos, or a description of a software component in a distributed system.

The dominant electronic information retrieval system in the world today is the World Wide Web. The largely unstructured nature of the Web means that the primary method of identifying a web-page containing the information which a user requires is to use a search engine. Search engines normally generate full-text indices which can be used to quickly identify web pages which contain all the words included in the user's search query. Page-ranking algorithms are then used to present the most relevant of those web-pages to the user.

Whilst this represents an effective method of retrieving electronic information relevant to a query, the only stage at which human intelligence is exploited is in the page-ranking algorithm (which captures human's recognition of the worth of a site by counting the number of web-pages which link to the site in question). The creation of the full-text index is purely automatic.

It is hoped that 'tagging' systems will improve search results by allowing a user to decide which labels or keywords should be attributed to a resource.

When a user finds a web-page which contains useful information he can save the address (URL) of the webpage on the computer which he is using to browse the Web. This is the familiar 'bookmarking' process. The 'bookmarking' interface enables a user to store bookmarks in a hierarchical folder system. Hence, the user is able to navigate to a useful page by drilling down to a relevant folder in the hierarchical folder system.

So-called social bookmarking is a development of this idea in which a user can upload the bookmarks stored on their own computer to a server computer. That server computer then offers the bookmark information to others.

Some such sites offer users the ability to add annotations (tags) to the shared bookmarks. These annotations might be user ratings for the web-page or keywords which the user has assigned to the web-page (the latter often being referred to as 'tags'). An example of such a site is the website del.icio.us. The web-site del.icio.us allows users to see a list of sites tagged with a given word by users. It is trivial to rank them by the number of users which have given a web-page the same tag. This gives some idea of user's perception of the quality of the webpage and also its relevance to that tag.

Unlike top-down centralized approaches, collaborative tagging systems (sometimes referred to as folksonomies) like del.icio.us provide users with the freedom to use tags of their choice and thus capture the way in a community of users describe and categorise resources. The community of users is thus provided with a set of resources which are tagged in a way which allows them to quickly retrieve relevant resources.

Where a community of users includes users who describe and categorise resources in different ways, the above benefits are diluted. To overcome this, some systems suggest tags to the user which better fit with the way other members of the community of users have chosen to tag the resource.

A straightforward way of doing this is to present the user with tags which have proved popular amongst the community of users. A common way of providing a user with a visualisation of this is using tag clouds, visual representations where each tag is displayed with a font size which is proportional to its popularity. Second generation tag clouds integrate the notion of relationships among tags or their meaning as seen in the paper entitled "Improving Tag-Clouds as Visual Information Retrieval Interfaces" presented by Y. Hassan-Montero and V Herrero-Solana at the International Conference on Multidisciplinary Information Sciences and Technologies, in October 2006.

In del.icio.us, when a user visits the page containing all the bookmarks tagged with a given tag, a list of related tags to that selected one is shown inside a sidebar. The related tags might be those which are found to frequently be applied together with the given tag.

A problem arises however in that some users use tags which are idiosyncratic to themselves or are unique to a group to which they belong, which group forms only a small fraction of the group of people tagging the resources in the system.

Z. Xu, Y. Fu, J. Mao, D. Su present a paper entitled "Towards the Semantic Web: Collaborative Tag Suggestions", in *Proceedings of the Collaborative Web Tagging Workshop at the WWW* 2006, Edinburgh, Scotland, 2006. In that paper they point out the desirability of a set of tags applied to an object to include tags of various types. The paper refers to these types as 'facets' and list 'content-based tags', 'context-based tags', 'attribute tags' and 'subjective tags' as examples of 'facets'.

According to a first aspect of the present invention, there is provided a method of electronic resource annotation comprising:
 receiving, a plurality of groups of tags;
 selecting on the basis of one or more tags received from a user and said groups of tags, one or more groups of tags under-represented in the tags received from said user; and
 proposing tags from said under-represented group to said user as said user applies tags to a resource.

By arranging tags into groups of tags where it is desirable that the set of tags applied to a resource includes tags from each of the groups, monitoring tags input by the user, finding groups of tags which are under-represented in the tags so far entered by the user in relation to the resource, and proposing to the user tags from those under-represented groups, more coherent or descriptive sets of tags for resources are gathered from users. Where the resources are services in a distributed computer system then a more rapid identification of a suitable service or substitution of one service for another is enabled. Where the resources are documents or other items of electronic media, then a more rapid retrieval of an appropriate document or media article is enabled.

Preferably, each of said groups of tags comprise a group of tags often used by said user, and one or more of groups of tags often used by respective groups of users, said selection identifying one or more groups of users whose tagging behaviour differs from the user, said proposal proposing tags to said user favoured by said one or more groups of users with different tagging behaviour as said user applies tags to a resource.

By suggesting tags representative of tags applied by groups whose tagging behaviour diverges from a user's individual tagging behaviour a more coherent set of tags for describing resources in a system is provided. In addition, the balancing of tags typically used by different groups of users allows, for example, the user's personal/idiosyncratic tags to be included to some degree in the suggested tags but allows those to be counteracted by collectively popular tags which tend to me the tag descriptions applied by users in general to the resources more globally coherent.

Preferably, said method further comprises recognising user selection of said one or more proposed further tags, and repeating said selection and proposal steps.

In this way the list of suggested tags can be updated each time the user enters another tag to be applied to the resource.

According to a second aspect of the present invention, there is provided distributed system comprising one or more user terminals, an electronic resource store, a resource label store for storing, for each of said electronic resources, labels applied by users to said electronic resource, and communications links between said user terminal and said electronic resource data store and between said user terminal and said resource label store;

said distributed system further comprising a label group store which stores groups of labels of different types;

wherein each of said user terminals is arranged in operation to:

enable said user to select an electronic resource;

in response to said selection, to display said selected electronic resource on a display of the user terminal;

to receive via a user interface provided by the user terminal, textual labels which the user considers appropriate to said selected electronic resource; and to send said textual labels together with an indication of said resource to said resource label store to enable said store to be updated;

said distributed system being arranged in operation to respond to a user selection of an electronic resource by identifying one or more label groups under-represented in labels input by said user, and to select labels from said one or more under-represented groups and to send said labels to said user terminal;

said user terminal being further arranged in operation to present said user with said sent labels as proposals for labels to be applied to the selected resource.

BRIEF DESCRIPTION OF THE DRAWINGS

There now follows a description, given by way of example only, of specific embodiments of the present invention, which refers to the accompanying drawings in which:

FIGS. 2A to 2J show service records stored in respective service hosts of the infrastructure;

FIGS. 3B-1 to 3B-5 show a user profile and group tag lists stored in an administration computer;

FIG. 4 is a flow-chart illustrating the how a service host registered with the service-based infrastructure;

FIG. 5 is a flow-chart illustrating the operation of a service browser for discovering services and presenting the output of those services;

FIG. 10 shows a graphical user interface that presents the automatically-generated taxonomy to an administrator;

DETAILED DESCRIPTION OF PRESENT EXAMPLE EMBODIMENTS

Figure 1:
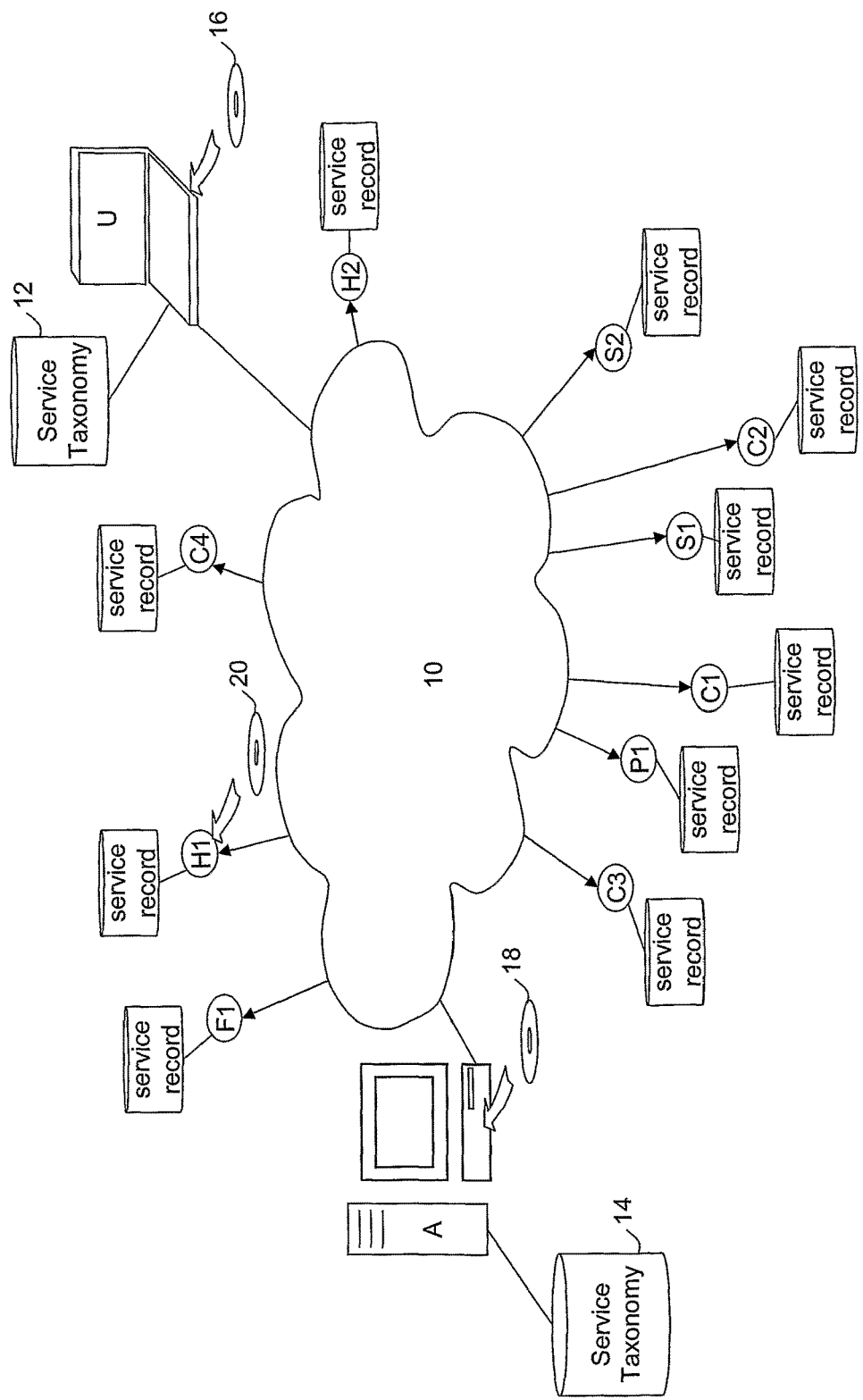
FIG. 1 shows networked service-based infrastructure used in supporting a metropolitan police force.

FIG. 1 shows a plurality of electronic devices including displays, cameras and location-reporting systems (C1, C2, C3, C4, H1, H2, S1, S2, F1, P1). Each of these devices is able to run application programs, and components of applications distributed across the infrastructure, since it includes an embedded system which runs a suitable operating system such as Windows CE. Each device has inbound and outbound communications links with communications network 10, and has a persistent memory in which updateable service records are stored. The electronic devices provide services in response to commands issued by a user of laptop computer U connected to the network 10. The laptop computer U includes persistent storage 12 such as a hard disk. Also connected to the network 10 is an administration computer A which has persistent storage 14. Although only one user computer is illustrated, in practice a plurality (tens or even hundreds) of such user computers might be connected to the network 10.

Each of the programmable devices/computers stores and executes middleware which enables the devices/computers to overlay an application-level network on the network, to provide services to other devices/computers on the network and to find and execute services on other devices/computers in the network. An example of suitable middleware is NEXUS middleware as described in the paper 'NEXUS—resilient intelligent middleware' by Nima Kaveh and Robert Ghanea-Hercock published in BT Technology Journal, vol. 22 no. 3, July 2004 pp 209-215—the entire contents of which are hereby incorporated by reference. FIG. 1 shows the middleware from CD-ROM 20 being installed on electronic device H1—it is to be understood that the middleware will be installed on each of the other electronic devices too. The middleware might instead be introduced as firmware in the electronic device, or be downloaded from a program server (not shown) connected to the network 10.

Alternatively, commercially available middleware such as IBM's WebSphere or BEA's WebLogic could be used.

A service browser application is loaded from CD 16 onto laptop U which in addition to providing a user interface enabling the user to request services from the programmable devices, also provides the user with an interface allowing the user to augment the service records by adding one or more tags to those service records. Correspondingly, each of the programmable devices is provided with software which responds to service requests and allows the service record stored in the device's persistent memory to be updated.

Management software is loaded from CD 18 onto administration computer A which enables the administrator to download service records from the various electronic devices, process those service records, and then upload amended service records to the various devices. The processing of service records include the semi-automatic categorization of those service records as will be described in detail below.

FIGS. 2A to 2J show the service records stored at each of the devices (C1, C2, C3, C4, H1, H2, S1, S2, F1, P1). Each service record includes a service identifier (leftmost column), a list of user-attributed tags assigned by users and/or administrators (second column), and a tag-based categorisation of the service (rightmost column). It will be seen that each tag comprises a user ID together with a word or concatenated combination of words. The service identifier is input at the time the device is set-up, the user-attributed tags and category fields are populated during use of the system as described below.

Figure 3A:
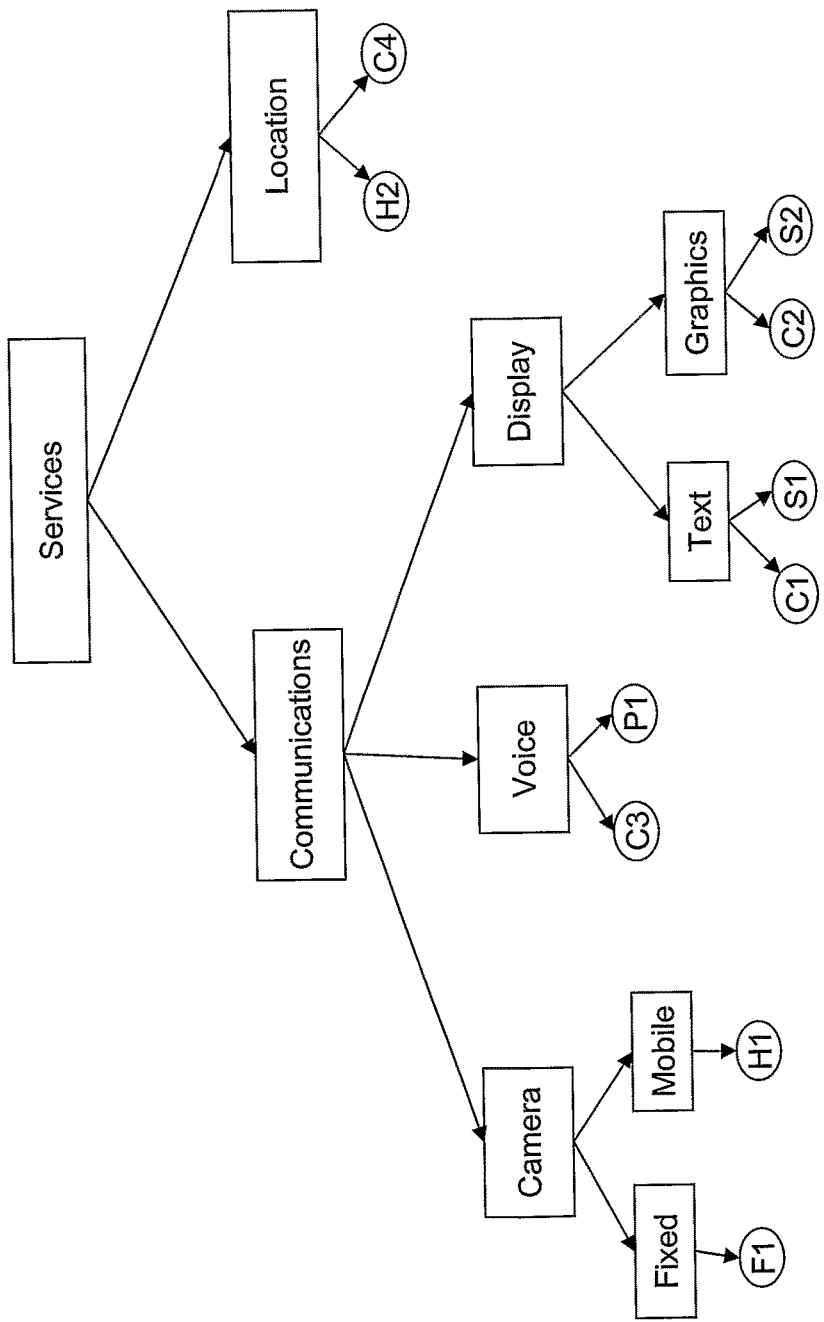
FIG. 3A shows the services offered by the service-based infrastructure organized into a taxonomy.

FIG. 3A shows a service taxonomy which is generated by the administration computer A by a semi-automatic process which will be described in detail below. The service taxonomy is stored in the persistent storage 12 at each client computer (e.g. FIG. 1: U) in the service-based infrastructure. The service taxonomy is stored as a tree, with the leaf nodes of the tree including references to services which have been categorized as belonging to the category represented by the leaf node. Each node of the tree includes a list of tags associated with that the category represented by that node. The service taxonomy is also stored in the administration computer's persistent storage 14. The names of the service categories are chosen by the administrator during the manual phase of the categorization process, as will be described below.

FIG. 3B-1 shows a user profile stored in the persistent storage of the administration computer A. Each user of the system has such a profile associated with them. The profile includes a user ID (second row), and an indication of a user group to which this user belongs (third row). In the present example, it is envisaged that all users will belong to one of two groups—they will either be in the police force, or will belong to a local traffic agency.

The user profile further includes target tagging tendencies (fourth row) which are set by the administrator for each user. These values reflect the degree to which the administrator believes this user's selection of tags should match the tag set of each of the groups. In addition to the two groups mentioned above there is also a collective group that includes all users and a personal group that includes only this user. So, the first target weight (fourth row, second column), $w'_{personal}$, represents the degree to which the administrator believes this user should use tags he has used before. The second target weight (fourth row, third column), $w'_{police}$, represents the degree to which the administrator believes this user should use tags that users belonging to the police force—including this user—have used before. The third target weight (fourth row, fourth column), $w'_{traffic}$, represents the degree to which the administrator believes this user should use tags that users belonging to the local traffic agency have used before. The fourth target weight (fourth row, fifth column), $w'_{collective}$, represents the degree to which the administrator believes this user should use tags that all users have used before.

The user profile further includes (fifth row) actual tagging tendency values for this user ($w_{personal}$, $w_{police}$, $w_{collective}$, $w_{traffic}$). These are all initially set to 0.5 and are updated during operation of the system in a manner which will be described below.

FIG. 3B-2 shows a personal tag list which includes tags which this user has used when tagging services offered in the distributed system of FIG. 1. Where the tag has been used more than once by this user then the tag is accompanied with an indication of cumulative frequency of use of the tag.

FIG. 3B-3 shows a group tag list for the group of users in the Police Force. This list is a list of tags used by users belonging to the police force when tagging services offered in the distributed system of FIG. 1. Where the tag has been used more than once by a member of the police force then the tag is accompanied with an indication of cumulative frequency of use of the tag by members of the police force.

Figure 4:
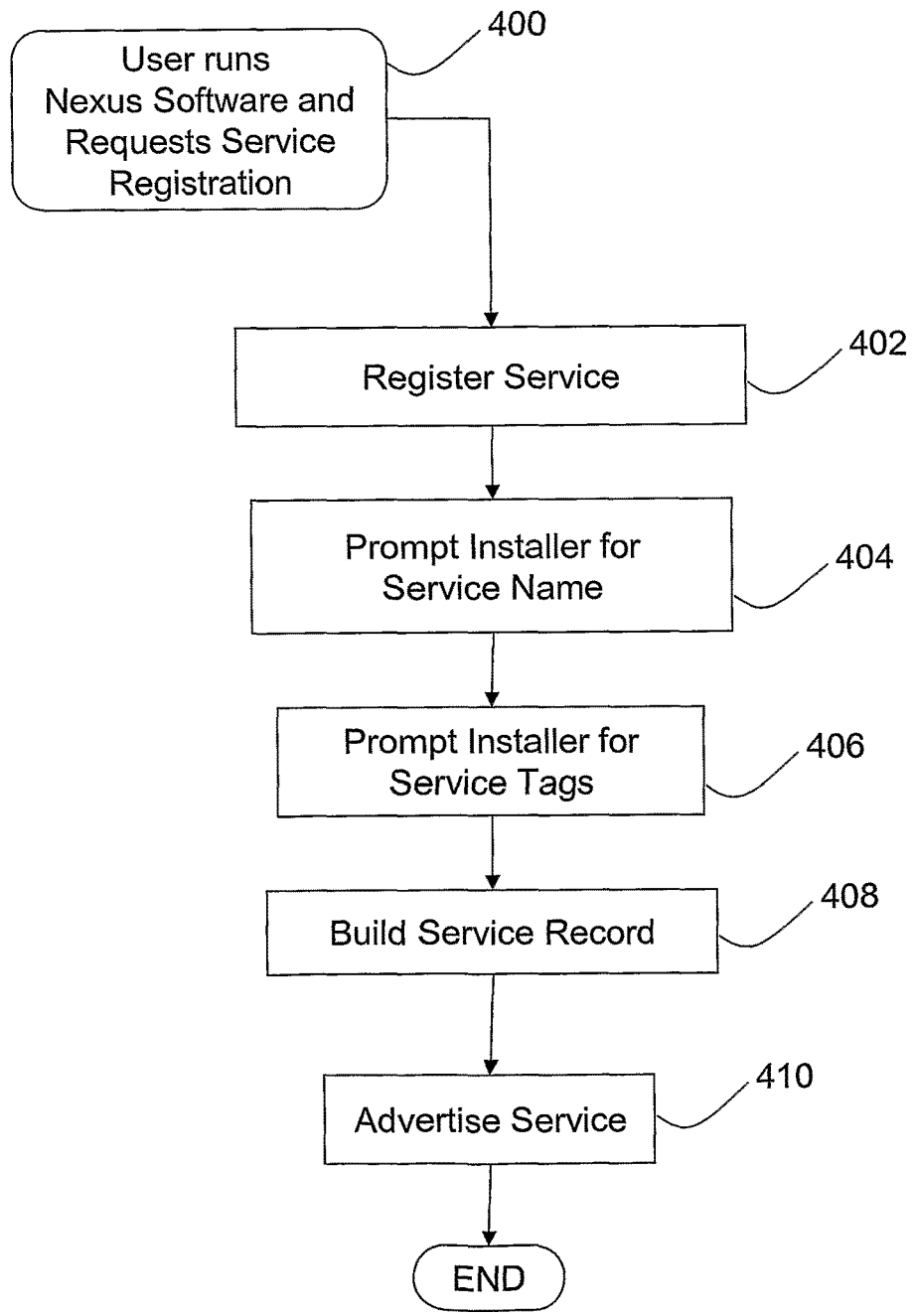

FIG. 3B-4 shows a group tag list for the group of users in the Traffic Control Agency. This list is a list of tags used by users belonging to the traffic control agency when tagging services offered in the distributed system of FIG. 1. Where the tag has been used more than once by a member of the traffic control agency then the tag is accompanied with an indication of cumulative frequency of use of the tag by members of the traffic control agency.

FIG. 3B-5 shows a group tag list for all users of the distributed system. This list is a list of tags used when tagging services offered in the distributed system of FIG. 1. Where the tag has been used more than once the tag is accompanied with an indication of cumulative frequency of use of the tag.

FIG. 4 shows service installation software provided as part of the Nexus middleware. The installation process starts with the user installing and running the Nexus software, (step 400) on the electronic device (e.g. H1) and requesting the registration (step 402) of the device's in-built software as a Nexus service. The user is then prompted (step 404) to provide a name for the service. The user is also prompted (step 406) to enter any tags which he considers should be applied to the service. The program then builds (step 408) a service record (FIG. 2A-2J) for the service including the information entered by the installer. Initially, the category field of the service record is set null. The service is then advertised (410) across the Nexus system, allowing it to be invoked by, for example, a user of user computer U when running the Nexus service browser. Those skilled in the art will realise that the service will be described using a service description language such as WSDL. The service description includes interfaces allowing a remote computer to query and update that service record.

Figure 5:
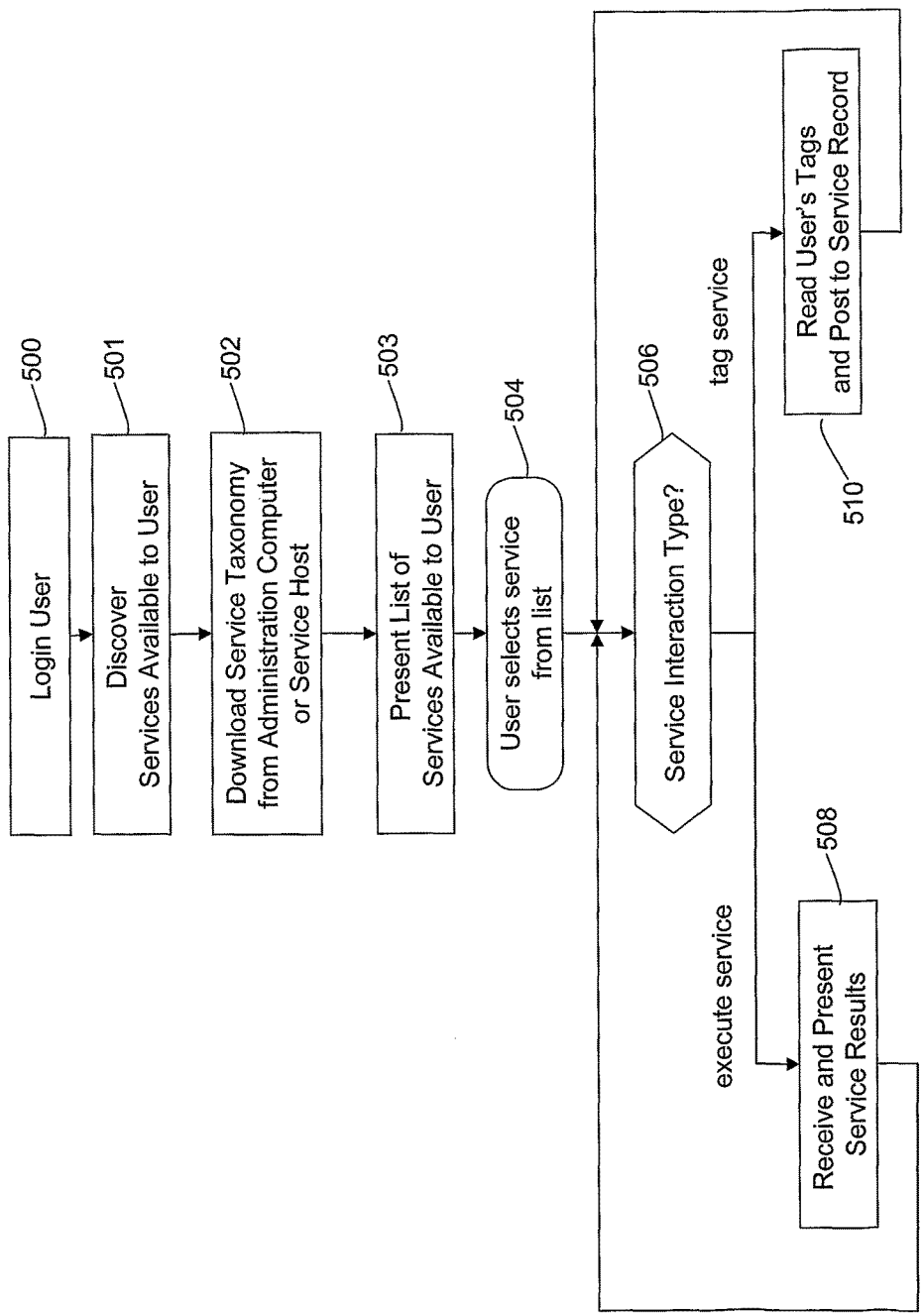
Figure 6:
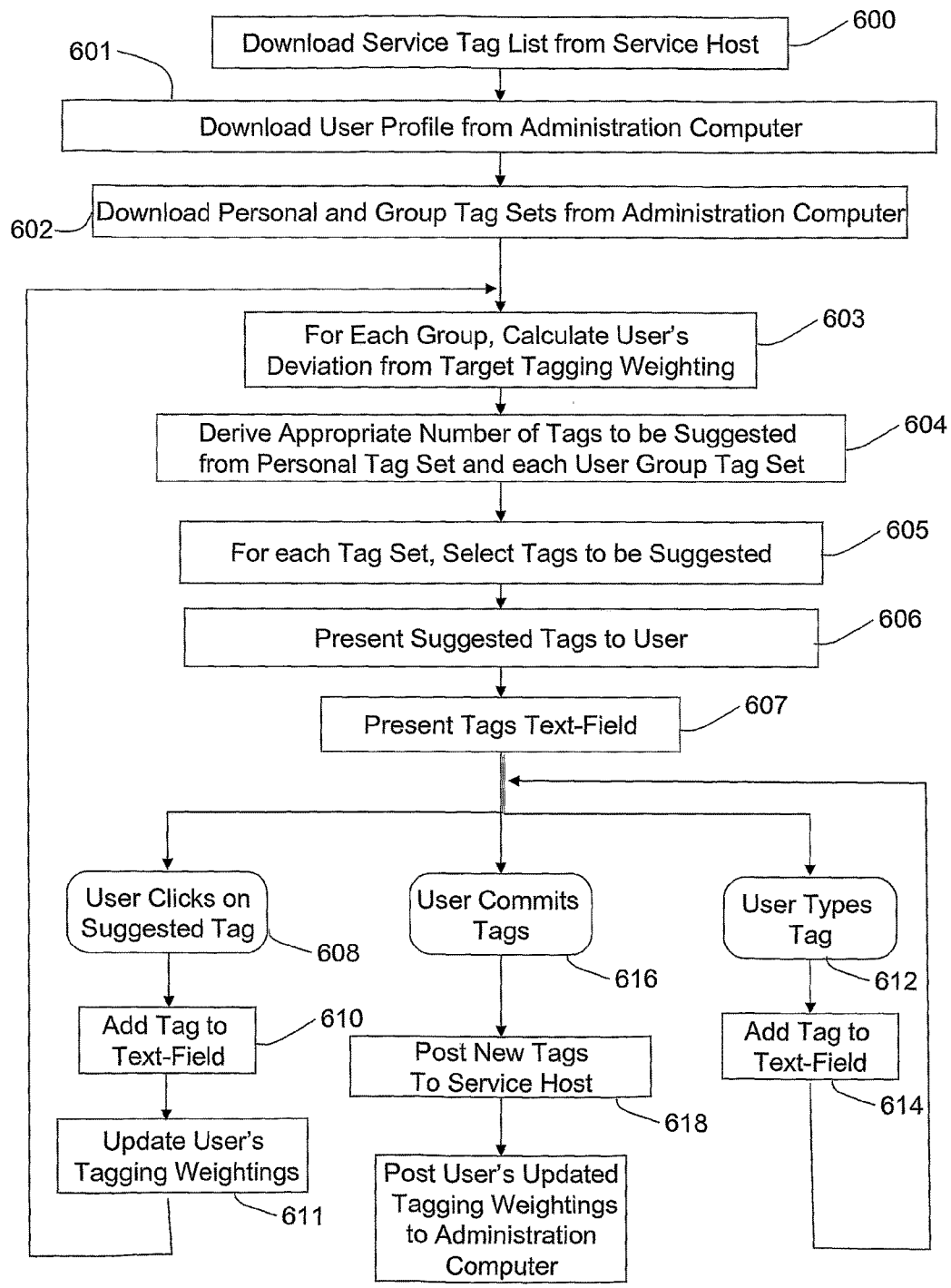
FIG. 6 is a flow-chart showing the operation of the service tagging interface offered by the service browser in more detail.

FIG. 5 shows the operation of the user computer U when the Nexus service browser is run on that computer. When the program is started by the user, the user logs onto the system by contacting the administration computer A (step 500). Nexus middleware is used to discover (step 501) services which are available via the network 10. The Nexus middleware controls the user computer to download (step 502) the current service taxonomy (FIG. 3A) from either an administration computer or a service host. The service browser then presents (step 503) the user with a list of the available services. The available services are then presented as a collapsible/expandable tree that mirrors the service taxonomy (FIG. 3A). The user is then prompted to select a service from the list. On selecting (step 504) a service the user is then asked (step 506) to select whether he wishes to execute the selected service or tag the selected service. If the user chooses to execute the selected service then the service host executes the service and returns (step 508) the result of the service—which may merely be an assurance that a requested service was carried out—to the user's computer U. If the user chooses to tag the selected service then the processing shown in FIG. 6 is carried out.

The user tagging process (FIG. 6) begins by sending a database query to the electronic device which hosts the service in question (C1, C2, C3, C4, H1, H2, S1, S2, F1, P1). This query returns (step 600) a list of tags already ascribed to the service.

Thereafter, the user's profile (FIG. 3B-1) is downloaded (step 601) from the administration computer A, as is the user's personal tag list (FIG. 3B-2) and each of the group tag sets (FIGS. 3B-3 to 3B-5).

Having downloaded the user profile, the user's computer U the calculates, by subtracting the target tagging tendency values ($W'_{personal}$, $W'_{police}$, $W'_{collective}$, $W'_{traffic}$) from the actual tagging tendency values ($w_{personal}$, $w_{police}$, $w_{collective}$, $w_{traffic}$), this user's deviation from the target tagging tendency values. For example, if the values of the target and actual tagging tendency values are those seen in FIG. 3B-1, then the deviations will be calculated to be:

| User Group | User's Deviation from Target Adherence to This Group's Tagging Behaviour |
|---|---|
| This User | +0.35 |
| Police Force | +0.1 |
| Local Traffic Agency | −0.2 |
| All Users | −0.15 |

These values suggest, for example, that this user tends to over-use his own idiosyncratic set of tags, and under-use the set of tags favoured by members of the local traffic agency.

Next, an appropriate number of tags to be suggested from the user's personal tag list (FIG. 3B-2) and each of the group tag lists (FIGS. 3B-3 to 3B-5) is calculated (step 604). In the present example, this is simply done by suggesting eight tags to the user, five of those tags being chosen from the tag set having the lowest deviation value (i.e. the local traffic agency tag set taking the example values given in the table above), two of those tags being chosen from the tag set having the second-lowest deviation value (i.e. the all users tag set taking the example values given in the table above), and one tag being chosen from the tag set having the third-lowest deviation value (i.e. the police force tag set taking the example values given in the table above).

Having found how many tags are required from each tag set, suggested tags are chosen (step 605) on the basis of the tag's popularity within that user group. In preferred embodiments, the suggested tags are also chosen to select those tags which are often found to occur together with the tags so far selected by the user. To achieve this the user's computer must additionally download tag co-occurrence values, and the administration computer must periodically re-calculate those values.

The eight tags selected from the three groups whose behaviour this user's tagging least adheres to can then be suggested (step 606) to the user, thus encouraging the user to adopt a tagging practice determined by the administrator.

The user is then presented (step 607) with an interface including a text-field into which the user can type tags.

The interface is programmed such that if a user clicks (step 608) on one of the suggested tags then the tag is added (step 610) to the text field.

Words the user types are also added (step 614) to the text field.

Each time the user adds a tag to the text field by selecting one or more of the suggested tags, the user actual tagging tendency values ($w_{personal}$, $w_{police}$, $w_{collective}$, $w_{traffic}$) (are updated as follows:

The group tag set to which the selected tag belongs is found. The corresponding actual tagging tendency value for that group for this user is then increased by a fixed amount (say 0.05). The actual tagging tendency values for the other groups is decreased by a fixed multiple (say 0.95).

By way of example, if the prevalence of tags from the under-represented local traffic agency tag set in the suggested tags (it will be remembered that five out of the eight suggested tags will come from that tag set) causes the user to select a tag from the local traffic agency tag set, then this user's actual tagging tendency values will be updated as follows:

$w_{traffic}=0.2+0.05=0.25$ $w_{personal}=0.85*0.95=0.81$ $w_{police}=0.7*0.95=0.67$ $w_{collective}=0.35*0.95=0.33$ Thereafter, the adaptive tag suggestion (steps 603-607) is repeated using the newly adjusted actual tagging tendency values.

Continuing the example, in this iteration, the deviations calculated in step 603 will be:

| User Group | User's Deviation from Target Adherence to This Group's Tagging Behaviour |
|---|---|
| This User | +0.31 |
| Police Force | +0.07 |
| Local Traffic Agency | −0.15 |
| All Users | −0.17 |

Which will this time result in five tags being suggested from the all users tag set. It will thus be seen how the tag suggestions are adapted to encourage the user to adopt a tagging behaviour which adheres to different groups' tagging behaviour to a degree determined by the system administrator.

When the user commits the tags by pressing the return or enter key, or pressing a 'Commit' button, the tags in the text field are transmitted (step 618) to the electronic device (C1, C2, C3, C4, H1, H2, S1, S2, F1, P1) hosting the service in question. On receipt of that message, the electronic device (C1, C2, C3, C4, H1, H2, S1, S2, F1, P1) updates its service record by adding the committed tags to its record.

Figure 7:
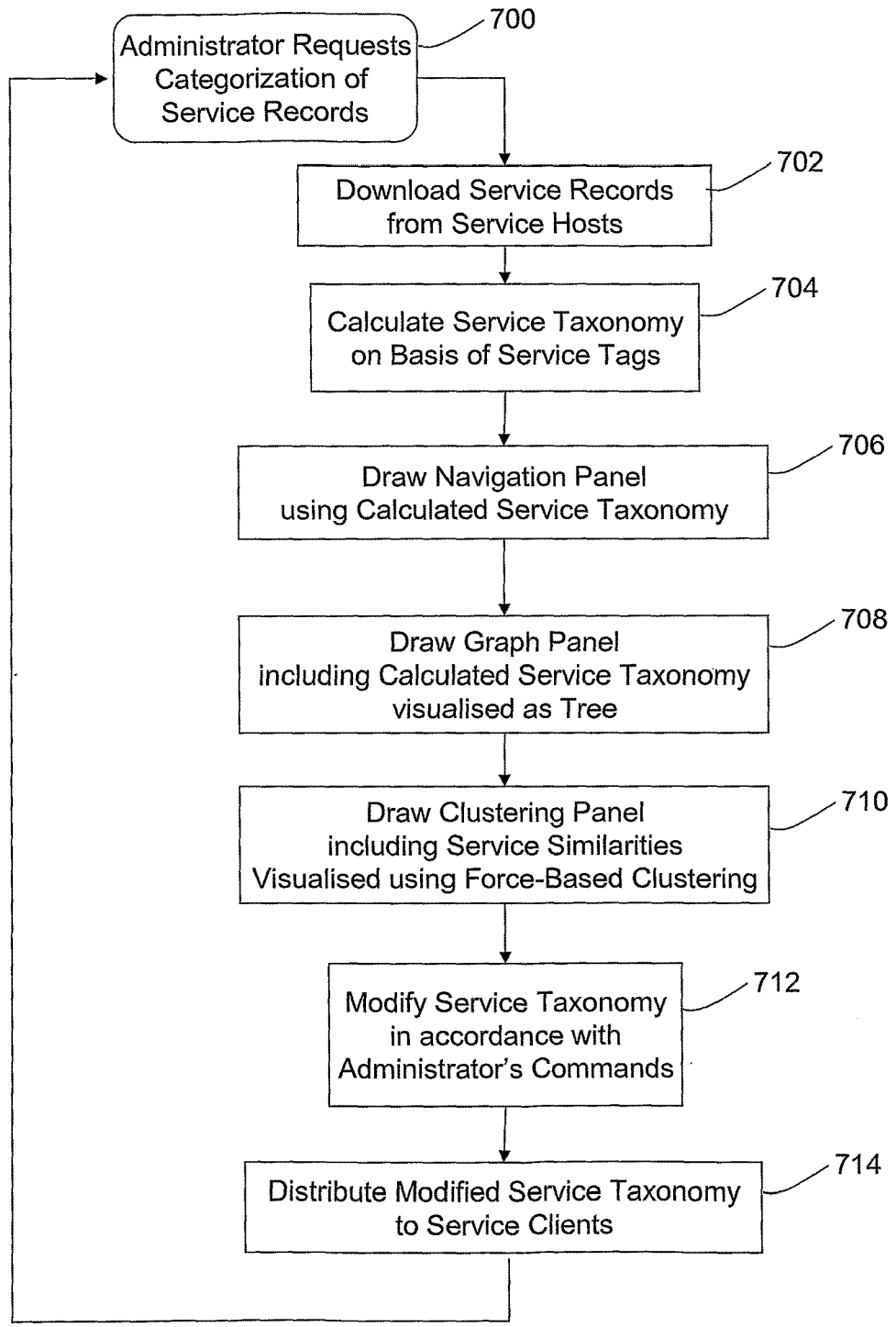
FIG. 7 is a flow-chart illustrating how an administration computer in the service-based infrastructure performs the semi-automatic construction of a service taxonomy for subsequent use in the service-based infrastructure.

FIG. 7 shows the semi-automatic categorization process which is performed by the management application loaded onto the Administrator's computer A. As will more be explained more fully below, the categorisation process is semi-automatic in that the program generates a proposed categorisation automatically and then provides the administrator with an interface (FIGS. 10 and 11) which enables him to modify that categorisation manually.

The semi-automatic categorization process (FIG. 7) is triggered by the administrator requesting (step 700) the categorization of the service records in the system. The categorization process begins with the administration computer A downloading (step 702) the service records (FIGS. 2A-2J) from each of the electronic devices (C1, C2, C3, C4, H1, H2, S1, S2, F1, P1) and concatenating those records in order to form a service table, each row of which corresponds to a service record (FIG. 2A-2J).

Figure 8:
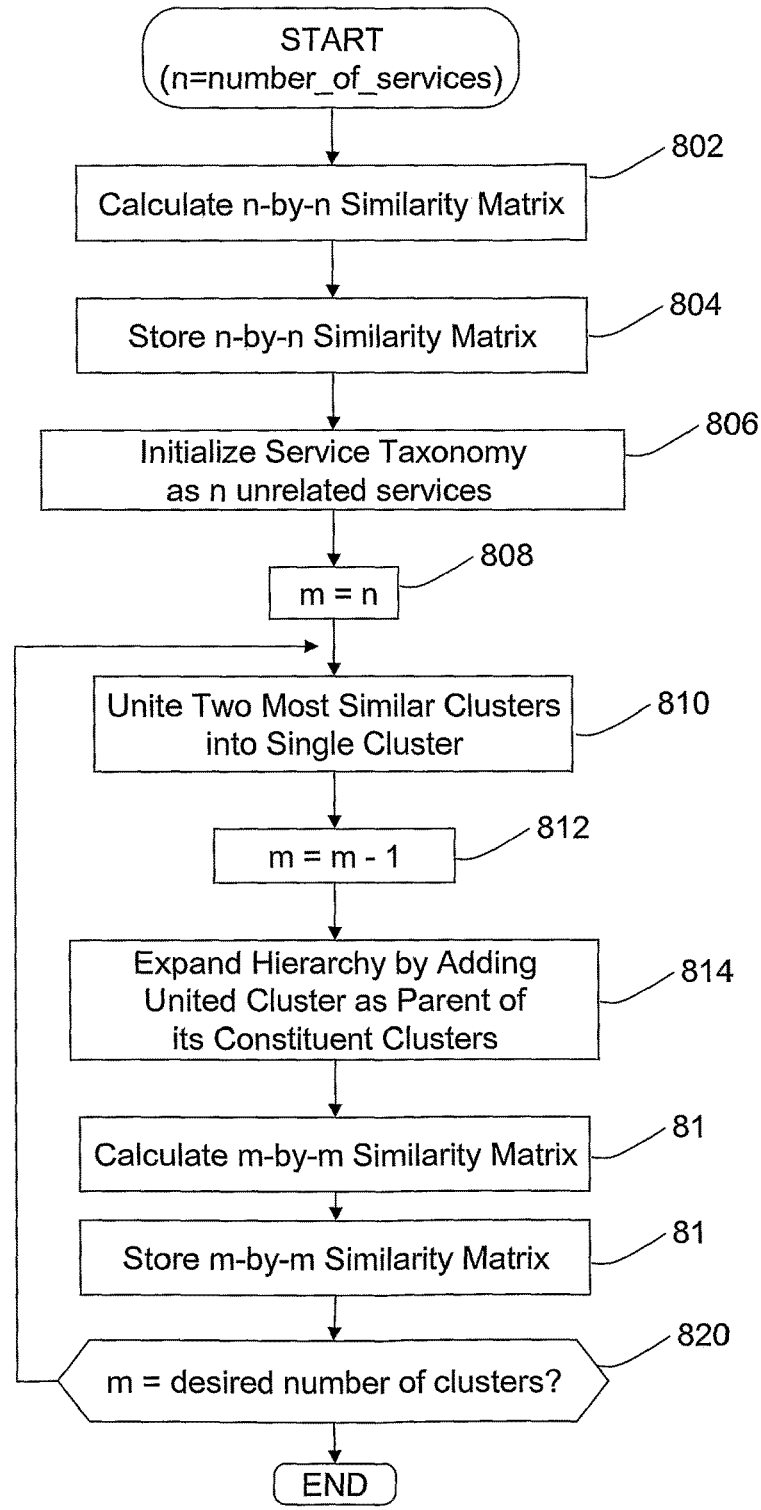
FIG. 8 is a flow-chart showing the automatic phase of the construction of a service taxonomy.

The service table is then processed (step 704) to derive a hierarchical categorisation of the different services (the service taxonomy of FIG. 3) on the basis of the tags found in the downloaded service records (FIGS. 2A-2J). This automatic tag-based categorization will now be described in more detail with reference to FIG. 8.

The clustering (FIG. 8) follows a bottom-up approach where each of the n (in this example 10) services is initially regarded as a service cluster containing only that service. The process begins with the calculation of an n-by-n similarity matrix (step 802).

Figures 9A, 9B:
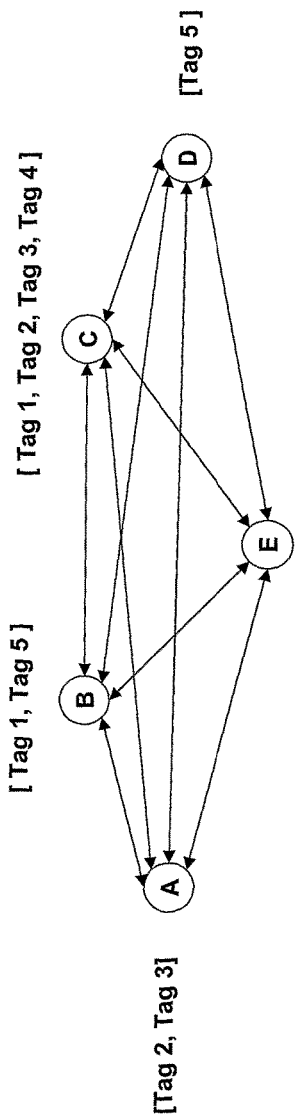
FIGS. 9A and 9B illustrate in more detail the calculations which are used in the automatic taxonomy construction.

To illustrate the calculation of a n-by-n similarity matrix, an example of 5 services (A-E) and the tags associated with them is seen in FIG. 9A. For each pair of services, a tag-based similarity measure is, calculated according to the following equation:

$$similarity(A, B) = \frac{number\_of\_tags\_A\_and\_B\_have\_in\_common}{\sqrt{number\_of\_tags\_in\_A} \sqrt{number\_of\_tags\_in\_B}}$$

Those skilled in the art will recognise this as a form of cosine similarity between the set of tags in set A and the set of tags in set B. The resulting n-by-n similarity matrix is seen in FIG. 9B. Those skilled in the art will realise that the matrix is symmetric, and hence only the elements above or below the diagonal need be calculated—the values along the diagonal also need not be calculated since they are by definition equal to 1.0.

Once the service similarity matrix has been calculated, it is stored (step 804) for use in subsequent visualisation of service similarity as will be described below.

An abstract data type representing the service taxonomy is then initialised as a set on n services (step 806) without any relationships between them. As will be explained below, the automatic categorisation process will add relationships between the services in order to build up a service taxonomy as seen in FIG. 3. Each node of the service taxonomy includes a list of tags associated with that node.

Thereafter, a cluster count (m) is initialised (step 808) to the number of services (n). This is followed by one or more iterations of a taxonomy building process (steps 810-818).

Each of the iterations of the taxonomy-building process begins with the most similar pair of clusters being identified and combined into a single cluster (step 810). For example, given the 5-by-5 similarity matrix seen in FIG. 9B, the services C and E will be identified as the most similar pair, and combined into a single cluster. The cluster count is reduced accordingly (step 812).

A node representing the combined cluster is then added to the service taxonomy, together with relationship data indicating that the combined cluster is a parent of each of the constituent services (or constituent clusters, or constituent service and cluster) (step 814). The lists of tags associated with each of the constituent services (or constituent clusters, or constituent service and cluster) will be combined to generate a list of tags (the intersection of two sets of tags) which is stored with the node representing the combined cluster.

An m-by-m similarity matrix is then calculated (step 816) by finding similarity measures between the new combined cluster and each of the other clusters/services (the other similarity values can simply be copied from the previous similarity matrix calculation). The similarity measures to the newly combined cluster are calculated using the combined list of tags mentioned above. The m-by-m similarity matrix is then stored (step 818).

A test (step 1006) is then carried out to determine whether sufficient clustering has now taken place. The test might simply be whether a desired number of clusters (say six in this particular example) has been reached. If the test is not met, then another iteration of the taxonomy-building process (steps 810-818) is carried out.

If sufficient clustering has taken place then the automatic phase of the semi-automatic categorization process ends (step 820).

FIG. 10 shows the interface presented to the administrator. The graphical user interface is partitioned into five panels as follows:

Clustering Panel: The services in the system are represented abstractly in this panel as circles and it is here (as will be explained below) that force-based clustering is applied as one means to enable the administrator to visualise relationships between them.

Navigation Panel: A set of tabs in this panel allow the user to alter the view of the system in the clustering panel by selecting subsets. Any existing structure in the form of categories of services (e.g. the taxonomy illustrated in FIG. 3) is reflected here with one tab per category.

Tag Panel: The top tags in the entire system of services are displayed in a ranked list. These may be selected and the view on the clustering panel will be updated accordingly.

Graph Panel: Any existing structure in the system of services is displayed in this panel as a graph. The structure might, for example, be a tree representation of the taxonomy illustrated in FIG. 3.

Toolbar: Details about the currently selected services are displayed in this panel as well as a search box offering the user to filter the view of the system by means of keywords. Additional pop-up panels are also accessible from here such as a tag cloud view.

Returning to FIG. 7, the semi-automatic categorization process continues by drawing different components of the management application's graphical user interface.

To provide the various visualisations seen in the graphical user interface a package called Prefuse (www.prefuse.org) is used.

The navigation panel is drawn using the service taxonomy calculated in the automatic categorization routine. A tab is presented for the currently selected category of the service taxonomy (FIG. 3). Initially, the category is set to the global 'services' category. In addition, tabs representing the immediate sub-categories are displayed. When the currently selected tab is not that representing the highest-level category, a further tab is provided which allows the administrator to move up one hierarchical level in the service taxonomy.

The graph panel is also drawn using the service taxonomy calculated in the automatic categorization routine. The service taxonomy is presented there in tree form.

The clustering panel is drawn (step 708) using a force-based clustering visualisation tool offered as part of the Prefuse package. The tool presents services as circles in the clustering panel and then moves them as if there were an attractive spring force between the circles which is in proportion to the cosine similarity between the services taken from the n-by-n similarity matrix calculated in step 804. This can assist the user in seeing how he might modify the membership of the different categories in order to improve upon the automatic categorisation.

In a preferred embodiment, the membership of the automatically generated categories is shown by distinctively highlighting the services belonging to different categories. An example of this can be seen in FIG. 11 where six automatically generated categories (1102-1112) are shown.

Returning to FIG. 7, the management application's graphical user interface allows the administrator to view the service taxonomy in the following ways.

Selection of Tab in Navigation Panel

By selecting a tab other than the one which represents the highest-level category, then only those services within the selected category are shown in the clustering panel.

Selection of Tag(s) in Tag Panel

On the administrator selecting one or more tags from the ranked list of tags in the tag panel the services having the selected tags are highlighted in the clustering panel.

Figure 11:
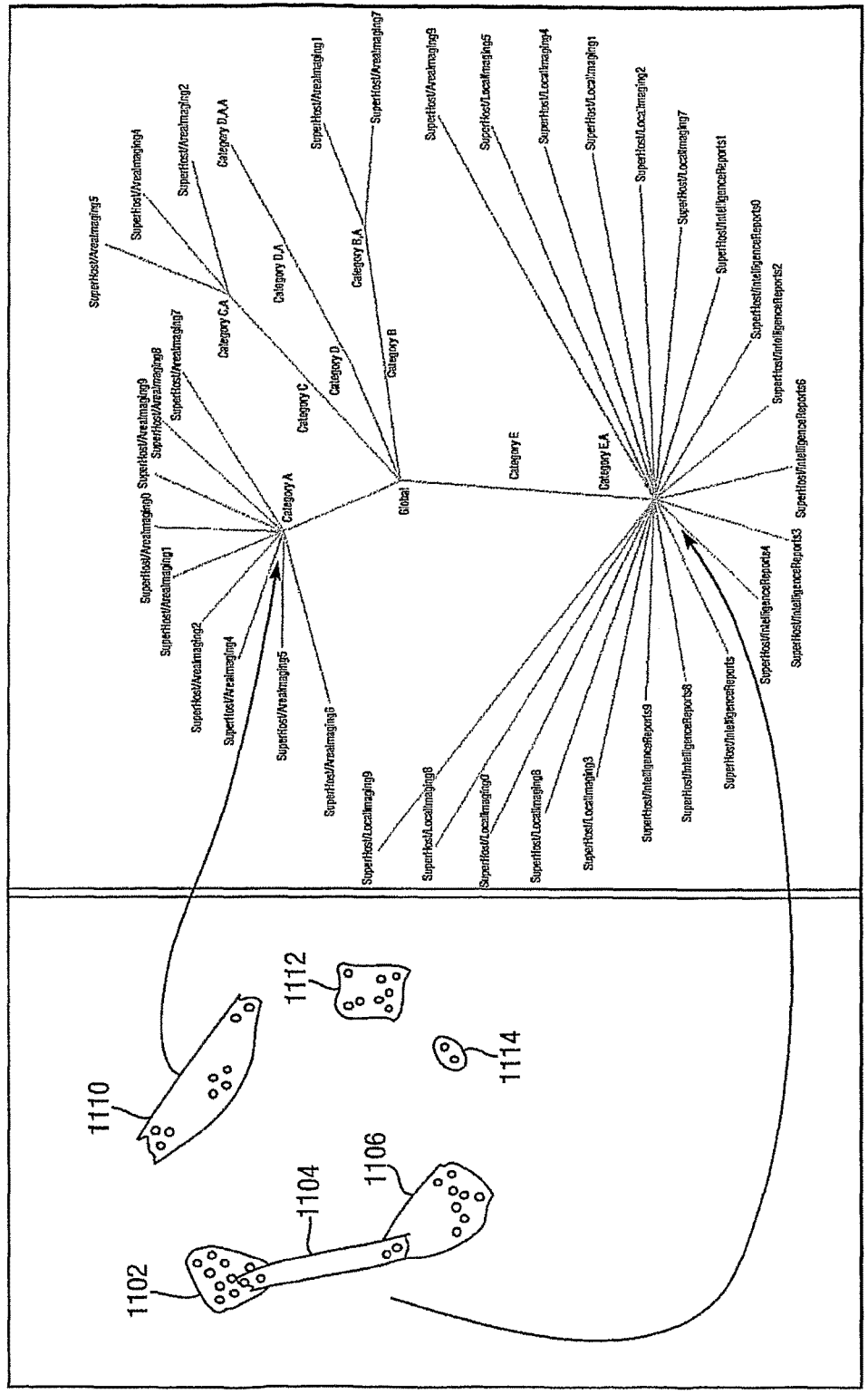
FIG. 11 shows how the administrator can use the graphical user interface to modify the automatically-generated taxonomy.

The management program then modifies (step 710) the service taxonomy (FIG. 3) in accordance with commands entered by the administrator using the graphical user interface (FIGS. 10 and 11).

Selection of Services in Clustering Panel

By selecting a group of entities in the clustering panel and issuing a 'Group' command, then the selected entities are formed into a group. The user is prompted to give a name to group. The service taxonomy is then updated to by adding a sub-category to whatever category is currently selected using the Navigation Panel. It will be realised that this enables the user to both merge and split categories.

Drag-and-Drop of Service Groups to Graph Panel

By selecting a group of services in the clustering panel, and then 'dragging-and-dropping' the selected group to a node on the tree drawn in the graph panel, the selected group is made a sub-category of whatever category is represented by the node on which the group is 'dropped'.

When the administrator considers that his modifications to the service taxonomy provide a beneficial categorisation of the services, he requests the administration computer to distribute (step 712) the modified service taxonomy to client computers (e.g. user computer U) in the network. The client computers then store the modified service taxonomy in persistent storage (12).

Thereafter, on finding that a remote service required by a user is not available, applications running on those client computers can the use the categorisation to propose other services in the same category as substitutes or even automatically substitute services in the same category.

Figure 12:
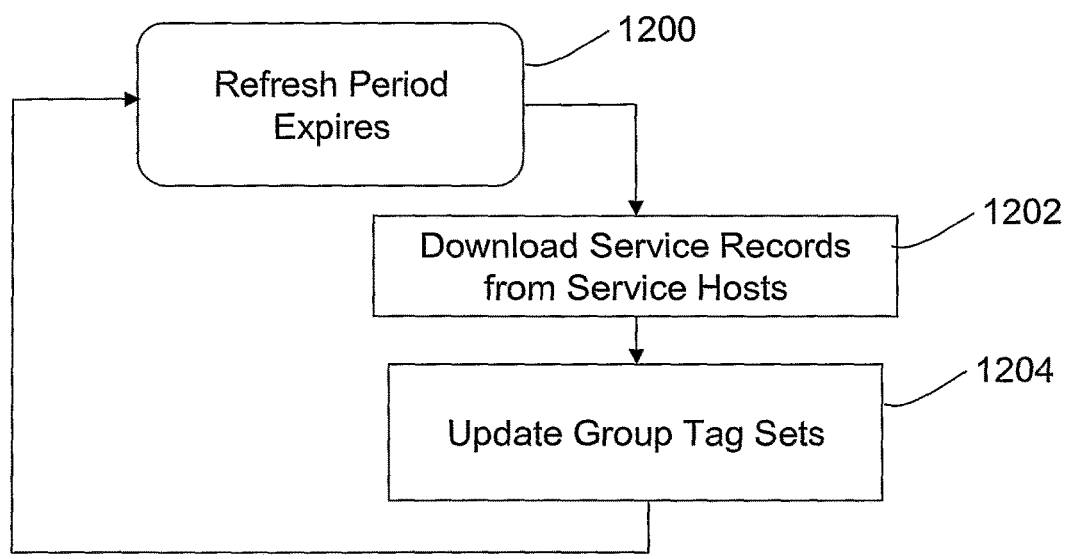
FIG. 12 shows how the administration computer periodically refreshes the group tag lists.

FIG. 12 shows how the administration computer A periodically downloads (step 1202) service records from the hosts (C1, C2, C3, C4, H1, H2, S1, S2, F1, P1) and thereby updates (step 1204) the group tag sets (FIGS. 3B-2 to 3B-5) stored in its persistent memory.

Possible modifications to the above embodiment include:

i) rather than services being tagged, documents, especially web-pages could be tagged. In that case, the benefit of expedited retrieval of documents relevant to a user's query would be realised.

ii) instead of the service records being distributed at service hosts, a centralised database could be used storing a plurality of records—each including, for example, URLs, tags ascribed to the URLs, and user IDs for each tag submitted iii) the service records could further include tag frequency for each tag, in that case, a more sophisticated cosine similarity based on tf-idf (term frequency—inverse document frequency) could still be calculated.

iv) a Euclidean similarity measure or other well-known document similarity measure could be used instead of a cosine similarity measure v) the administration facility could be built into the service browser vi) a service taxonomy could be imported to the management application and displayed in the graph panel. The user could then modify the existing taxonomy on the basis of the results of force-based clustering in the clustering panel vii) the above example focussed on the application of the invention to web services or other distributed application components. The present invention is also of great utility in the organisation of forum posts where many users submit their views on varied topics to a central server which stores all the forum posts together viii) Also, it should be noted, that from a middleware point of view there are uses of the taxonomy other than just presentation/filtering for the user. Although not explained in the Nexus reference mentioned above, the latest version of Nexus uses Topics to transmit messages across its Publish/Subscribe messaging infrastructure. One of the main benefits for having an administration system such as that described above is to reflect semantic taxonomic knowledge about the services down to the level that they are being advertised across the network. This way a user can (or the system on behalf of the user) can choose to only subscribe to the relevant subset of information (about Service Record changed etc.) and as such a bandwidth reduction may be achieved (especially important in a large-scale distributed system with low bandwidth). This provides content-based routing, not by the routing mechanism directly examining the content (e.g. deep-packet inspection), but instead indirectly from a variation of the above embodiment which analyses the metadata and involves the user in the process (taking the actual content into account) to derive the best possible set of categories, i.e. Topics to which the messaging infrastructure itself is structured viii) in embodiments where documents, rather than services, are being tagged, and the document in question has not previously been tagged, keywords derived automatically from the content of the document could be used in place of tags previously entered by other users.

ix) in the above embodiment, the suggested tags were chosen on the basis of the tag's popularity in describing resources belonging to the candidate category. In preferred embodiments, the suggested tags are also chosen to select those tags which are often found to occur together with the tags so far selected by the user. To achieve this the user's computer must additionally download tag co-occurrence values, and the administration data must periodically re-calculate those values.

x) in the above embodiment, the number of tags from different under-represented groups of users was fixed (five for the most under-represented group, two the second-most under-represented group and one for the third-most under-represented group). In other embodiments the number of tags might depend on a calculation of the degree to which each of the groups is under-represented.

xi) in the above embodiment, it was sought to obtain a balance of tags characteristic of different groups of users. However, in other embodiments, a balance of tags from different groups of types of tags is sought. To achieve this, tags are arranged into groups of types of tags, and those groups are downloaded to the administration computer, which then handles those groups as the groups of tags representative of different users are handled in the above embodiment.

In summary of the above, a distributed system is described in which resource utilisation decisions depend upon the categorisation of resource descriptions stored in the distributed system. In the principal embodiment, the resource descriptions are web service descriptions which are augmented with tags (i.e. descriptive words or phrases) entered by users and/or by web service administrators. The system stores, for different groups of users, groups of tags popularly used by users within those groups. By monitoring tags input by a user, and proposing tags to the user from any groups which are under-represented in tags input by the user, a more balanced set of tags describing resources in the system is obtained. This leads to a more coherent and focussed set of tags in the system, which in turns results in better resource utilisation decisions and hence a more efficient use of the resources of the distributed system.

What is claimed is:

1. A method of electronic resource annotation comprising operating a computer system to:
    arrange a plurality of tags applied by a plurality of users into at least two groups of tags favored by respective groups of users;
    store the arrangement of the plurality of tags into the at least two groups of tags favored by respective groups of users;
    store a tagging history for a user which aggregates tags used by said user in tagging a plurality of electronic resources;
    establish a degree to which each of the groups of tags favored by respective groups of users is represented in the tags included in the user's tagging history by comparing said user's tagging history with each of said plurality of groups of tags favored by respective groups of users to thereby provide a plurality of comparisons;
    based on the comparisons, identify one or more of said groups of tags favored by respective groups of users as being under-represented in the user's tagging history;
    based on the identification, propose tags from said identified under-represented group or groups of tags to said user as said user applies tags to a resource; and
    as a result of selection by the user of at least one of the proposed tags from said identified under-represented group or groups of tags, update the respective degrees to which each of the groups of tags favored by respective groups of users is represented in the tags included in the user's tagging history toward respective target values.

2. A method according to claim 1 wherein each of said at least two groups of users comprises two or more, but not all users.

3. A method according to claim 1 further comprising operating said computer system to recognize the user's selection of at least one said proposed tags, and repeat said selection, proposal and update.

4. A method according to claim 1 wherein said some of said proposed tags are appropriate to one under-represented group of tags favored by one group of users and one or more other proposed tags are appropriate to another under-represented group of tags favored by another group of users.

5. A method according to claim 4 wherein proposing tags involves emphasizing tags associated with groups which are more under-represented than said other under-represented group.

6. A method according to claim 1 further comprising operating said computer system to generate said groups of tags favored by respective groups of users from tags applied to resources by users.

7. A method according to claim 1 further comprising operating said computer system to store the respective target degrees of representation for each of said plurality of groups of tags favored by respective groups of users, and to emphasize tags chosen from said groups of tags in accordance with a comparison of the actual degree of representation of each group and the target degree of representation of said group.

8. The method according to claim 1 wherein each of said groups of tags favored by respective groups of users comprise a group of tags often used by said user, and one or more groups of tags often used by respective groups of users, said identification identifying one or more groups of users whose tagging behavior differs from the user, wherein said proposal proposes tags to said user favored by said one or more groups of users with different tagging behavior.

9. A distributed system comprising one or more user terminals, an electronic resource store, a resource tag store for storing, for each of said electronic resources, tags applied by users to said electronic resource, and communications links between said user terminal and said electronic resource data store and between said user terminal and said resource tag store;
    said distributed system further comprising:
        a tag group store which stores a plurality of tags arranged into a plurality of different groups of tags, each of said groups of tags representing tags favored by respective groups of users;
        a tagging history store, which stores, for each of one or more users, a tagging history for said user which aggregates tags used by said user in tagging said electronic resources;
    wherein each of said user terminals is arranged in operation to:
        enable said user to select an electronic resource;
        in response to said resource selection, to display said selected electronic resource on a display of the user terminal;
        to receive via a user interface provided by the user terminal, tags which the user considers appropriate to said selected electronic resource; and
        to send said tags together with an indication of said resource to said resource tagstore to enable said store to be updated;
    said distributed system being arranged in operation to:
        establish a degree to which each of said groups of tags representing tags favored by respective groups of users is represented in the tags included in the user's tagging history by comparing said tagging history for said user with said groups of tags representing tags favored by respective groups of users to thereby provide a plurality of comparisons;
        based on the comparisons, identify one or more of said groups of tags representing tags favored by respective groups of users as being under-represented in the user's tagging history,
        based on the identification, to propose tags from said one or more under-represented groups, and to send the proposed tags to said user terminal; and
        in response to selection by the user of at least one of the proposed tags from said identified under-represented group or groups of tags, update the respective degrees to which each of the groups of tags favored by respective groups of users is represented in the tags included in the user's tagging history toward respective target values; and
    said user terminal being further arranged in operation to present said user with said selected tags as proposals for tags to be applied to the selected resource.

10. The system of claim 9 wherein each of said groups of tags favored by respective groups of users comprise a group of tags often used by said user, and one or more of groups of tags often used by respective groups of users, said identification identifying one or more groups of users whose tagging behavior differs from the user, wherein said proposal proposes tags to said user favored by said one or more groups of users with different tagging behavior.

11. A non-transitory computer-readable medium tangibly storing instructions executable by a computer for causing the computer to perform functionality comprising:

arranging a plurality of tags applied by a plurality of users into at least two groups of tags, the groups of tags favored by respective groups of users;

storing the arrangement of the plurality of tags into the at least two groups of tags favored by the respective groups of users;

storing a tagging history for a user which aggregates tags used by said user in tagging a plurality of electronic resources;

establishing a degree to which each of the groups of tags favored by respective groups of users is represented in the tags included in the user's tagging history by comparing said user's tagging history with each of said plurality of groups of tags favored by respective groups of users to thereby provide a plurality of comparisons;

based on the comparisons, identifying one or more of said groups of tags favored by respective groups of users as being under-represented in the user's tagging history;

based on the identification, proposing tags from said identified group or groups of tags to said user as said user applies tags to a resource; and as a result of selection by the user of at least one of the proposed tags from said identified under-represented group or groups of tags, updating the respective degrees to which each of the groups of tags favored by respective groups of users is represented in the tags included in the user's tagging history toward respective target values;

wherein each of said groups of tags favored by respective groups of users comprise a group of tags often used by said user, and one or more of groups of tags often used by respective groups of users, said identification identifying one or more groups of users whose tagging behavior differs from the user, wherein said proposal proposes tags to said user favored by said one or more groups of users with different tagging behavior.

12. The non-transitory computer-readable medium of claim 11 wherein each of said at least two groups of users comprises two or more, but not all users.

13. The non-transitory computer-readable medium of claim 11 wherein the instructions executable by the computer cause the computer to perform further functionality comprising recognising the user's selection of at least one of said proposed tags, and repeating said selection, proposal and update.

14. The non-transitory computer-readable medium of claim 11 wherein said some of said proposed tags are appropriate to one under-represented group of tags favored by one group of users and one or more other proposed tags are appropriate to another under-represented group of tags favored by another group of users.

15. The non-transitory computer-readable medium of claim 14 wherein proposing tags involves emphasizing tags associated with groups which are more under-represented than said other under-represented group.

16. The non-transitory computer-readable medium of claim 14 wherein the instructions executable by the computer cause the computer to perform further functionality comprising generating said groups of tags favored by respective groups of users from tags applied to resources by users.

17. The non-transitory computer-readable medium of claim 11 wherein the instructions executable by the computer cause the computer to perform further functionality comprising storing the respective target degrees of representation for each of said plurality of groups of tags favored by respective groups of users, and emphasizing tags chosen from said groups of tags in accordance with a comparison of the actual degree of representation of each group and the target degree of representation of said group.

18. The non-transitory computer-readable medium of claim 11 wherein each of said groups of tags favored by respective groups of users comprise a group of tags often used by said user, and one or more of groups of tags often used by respective groups of users, said identification identifying one or more groups of users whose tagging behavior differs from the user, wherein said proposal proposes tags to said user favored by said one or more groups of users with different tagging behavior.

* * * * *